(12) United States Patent
Putman et al.

(10) Patent No.: US 10,955,651 B2
(45) Date of Patent: *Mar. 23, 2021

(54) UNIQUE OBLIQUE LIGHTING TECHNIQUE USING A BRIGHTFIELD DARKFIELD OBJECTIVE AND IMAGING METHOD RELATING THERETO

(71) Applicant: Nanotronics Imaging, Inc., Cuyahoga Falls, OH (US)

(72) Inventors: Matthew C. Putman, Brooklyn, NY (US); John B. Putman, Celebration, FL (US); Julie A. Orlando, Copley, OH (US); Jospeh G. Bulman, Kent, OH (US)

(73) Assignee: Nanotronics Imaging, Inc., Cuyahoga Falls, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/561,541

(22) Filed: Sep. 5, 2019

(65) Prior Publication Data

US 2020/0026053 A1 Jan. 23, 2020

Related U.S. Application Data

(63) Continuation of application No. 15/518,937, filed as application No. PCT/US2015/055283 on Oct. 13, 2015, now Pat. No. 10,437,034.

(Continued)

(51) Int. Cl.
*G02B 21/12* (2006.01)
*G02B 5/00* (2006.01)
(Continued)

(52) U.S. Cl.
CPC ........... *G02B 21/125* (2013.01); *G02B 5/005* (2013.01); *G02B 21/084* (2013.01); *G02B 21/361* (2013.01); *G02B 21/367* (2013.01)

(58) Field of Classification Search
CPC .. G02B 21/084; G02B 21/125; G02B 21/361; G02B 21/367; G02B 5/005
See application file for complete search history.

(56) References Cited

U.S. PATENT DOCUMENTS 5,831,736 A * 11/1998 Lichtman ............... G01B 11/24
356/613
5,867,312 A * 2/1999 Greenberg ........... G02B 21/088
359/385

(Continued)

FOREIGN PATENT DOCUMENTS

EP 1830214 9/2007
JP 2009-168582 7/2009
(Continued)

*Primary Examiner* — Tsion B Owens
(74) *Attorney, Agent, or Firm* — DLA Piper LLP (US)

(57) ABSTRACT

A process is provided for imaging a surface of a specimen with an imaging system that employs a BD objective having a darkfield channel and a bright field channel, the BD objective having a circumference. The specimen is obliquely illuminated through the darkfield channel with a first arced illuminating light that obliquely illuminates the specimen through a first arc of the circumference. The first arced illuminating light reflecting off of the surface of the specimen is recorded as a first image of the specimen from the first arced illuminating light reflecting off the surface of the specimen, and a processor generates a 3D topography of the specimen by processing the first image through a topographical imaging technique. Imaging apparatus is also provided as are further process steps for other embodiments.

12 Claims, 6 Drawing Sheets

Related U.S. Application Data

(60) Provisional application No. 62/063,564, filed on Oct. 14, 2014.

(51) Int. Cl.
  *G02B 21/08* (2006.01)
  *G02B 21/36* (2006.01)

(56) References Cited

U.S. PATENT DOCUMENTS

| | | | | |
|---|---|---|---|---|
| 7,273,298 | B2* | 9/2007 | Laschke | G02B 21/06 340/584 |
| 7,345,815 | B2* | 3/2008 | Shimizu | G02B 17/006 359/388 |
| 8,837,042 | B2* | 9/2014 | Paulus | G02B 21/125 359/368 |
| 2008/0192340 | A1* | 8/2008 | Yoshimine | G02B 19/0047 359/387 |
| 2014/0118529 | A1 | 5/2014 | Zheng et al. | |

FOREIGN PATENT DOCUMENTS

| | | |
|---|---|---|
| JP | 2013-205202 | 10/2013 |
| WO | 2006/057033 | 6/2006 |

* cited by examiner

UNIQUE OBLIQUE LIGHTING TECHNIQUE USING A BRIGHTFIELD DARKFIELD OBJECTIVE AND IMAGING METHOD RELATING THERETO

CROSS-REFERENCE TO RELATED APPLICATIONS

This application claims the benefit of U.S. Provisional Patent Application No. 62/063,564, filed Oct. 14, 2014, and incorporated herein by reference.

FIELD OF THE INVENTION

The present invention generally relates to imaging techniques and apparatus. In particular embodiments, it relates to topographical imaging techniques. In particular embodiments, it relates to imaging apparatus employing brightfield/darkfield objective, and improvements to such apparatus by employing a light barrier in the darkfield channel.

BACKGROUND OF THE INVENTION

Figure 1:
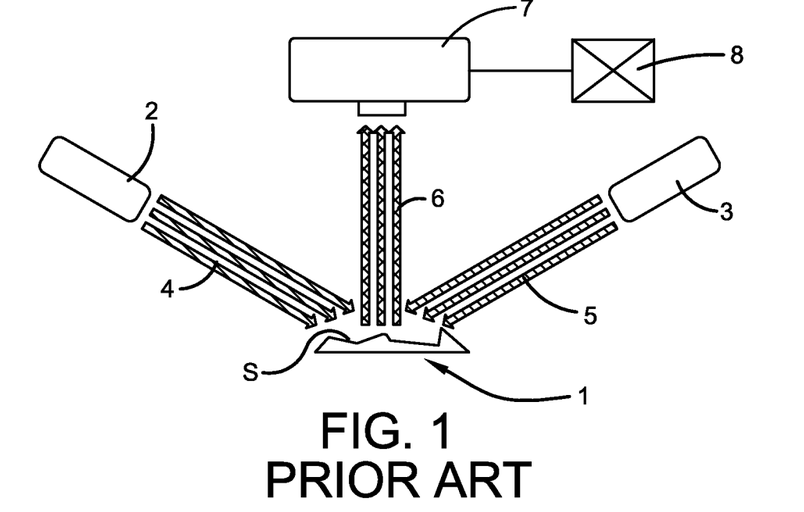
FIG. 1 is a schematic representation of a prior art process and apparatus for oblique illumination of a specimen for recording by a camera.

Standard techniques for creating 3D topographies include stylus instruments, profilometers, ultrasonic transducers, and laser triangulation among others. Shape-from-shading (SFS) and photometric stereo (PMS) have been used to create topographies by illuminating a specimen 1 with one or more a light sources 2, 3 directing oblique light 4, 5 toward the specimen 1 at an angle from 5 to 85 degrees and more typically from 25 to 75 degrees, as generally represented in FIG. 1. The oblique illumination is reflected from the surface S of the object as reflected light 6, and is captured by an image sensor (not shown) such as a CCD or CMOS sensor of a digital camera 7. The light sources are moved to different positions located circumferentially around the object, with images taken at these different positions. These images are used to calculate the topography of the specimen 1 by known means, employing appropriate processor(s) 8.

Figure 2:
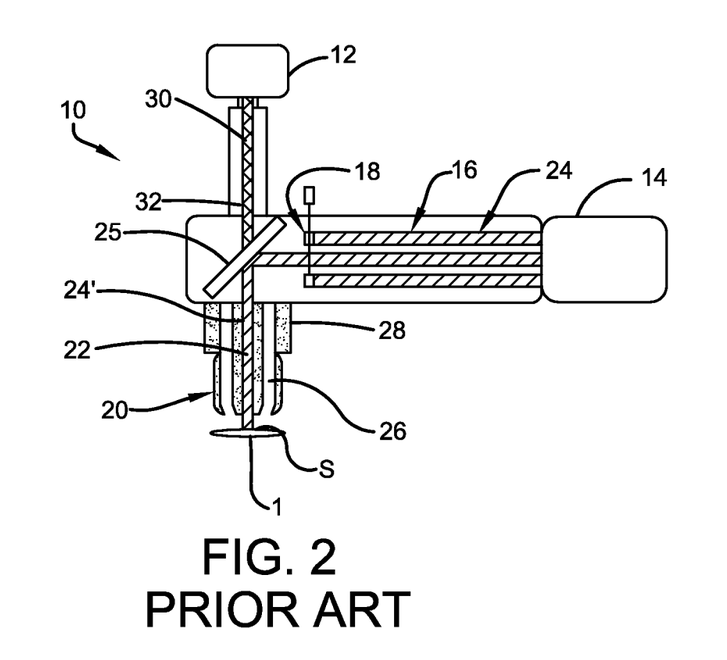
FIG. 2 is a schematic representation of a prior art brightfield/darkfield microscope, shown in brightfield imaging mode.
Figure 3:
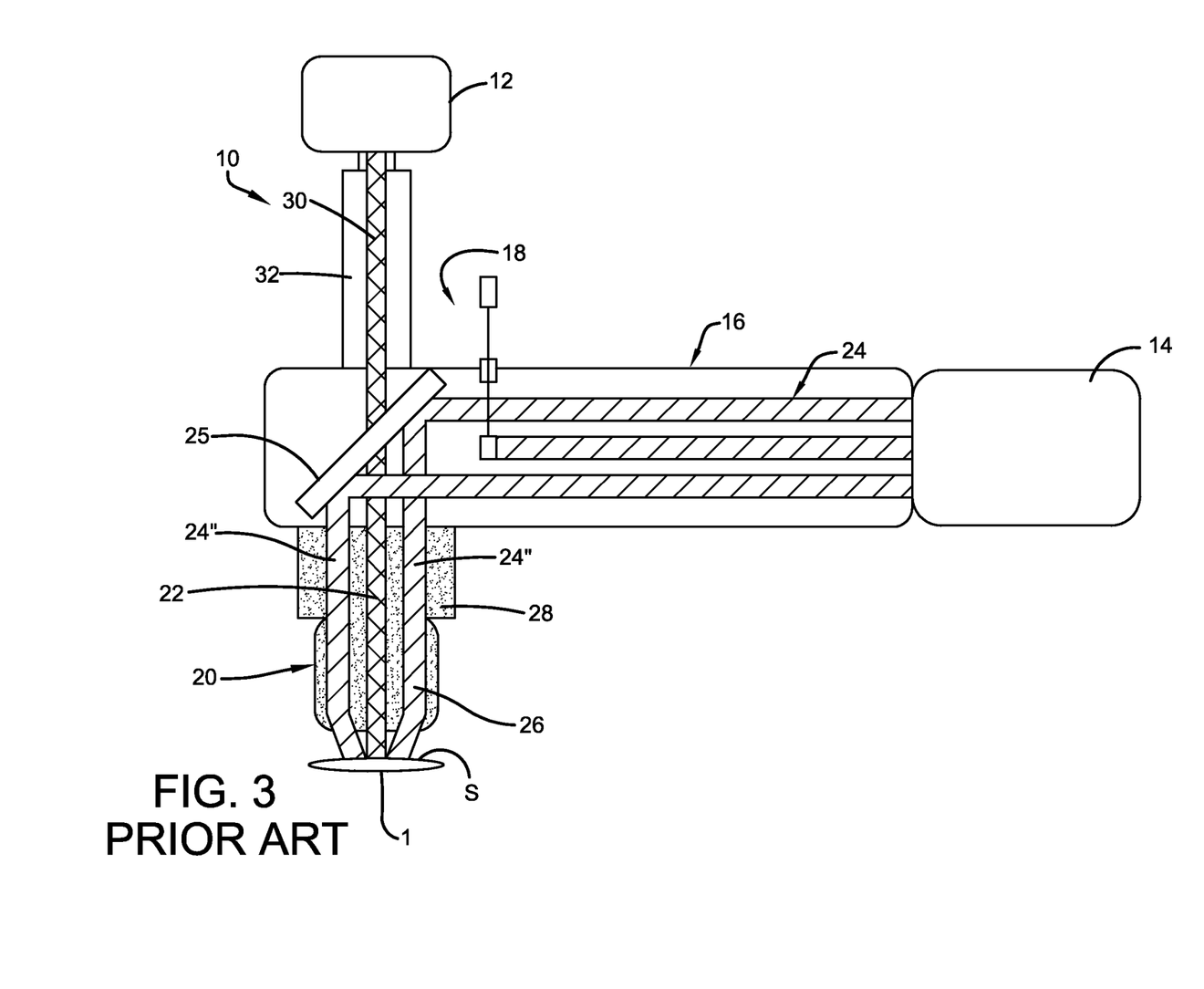
FIG. 3 is a schematic representation of a prior art brightfield/darkfield microscope, shown in darkfiled imaging mode.

A standard reflected light microscope employing brightfield and darkfield functionality is shown in FIGS. 2 and 3. In this example the microscope 10 is equipped with a camera 12. Oculars may also be present, such that the numeral 12 is to broadly represent oculars and/or a camera. Although the following description will refer to a reflected light microscope, similar techniques apply to transmitted light microscopes or instruments using brightfield/darkfield microscope objectives. A reflected light microscope 10 will be referenced in the following descriptions but the technology may apply to any imaging system using a brightfield/darkfield objective. The systems generally consist of a light source 14 providing light 24, a vertical illuminator 16, a brightfield/darkfield (BD) switch 18 and a BD objective 20. U.S. Pat. Nos. 3,930,713 and 4,687,304 describe a BD objective. In a standard BD objective 20, two channels are provided to guide the light to the specimen 1. The light 24 is directed to a mirror 25 that reflects the light 24 toward the specimen 1 downwardly through the vertical illuminator 16, the nosepiece 28, and BD objective 20. The BD switch 18, as schematically shown, serves to limit the light 24 to pass either into a brightfield channel 22 or darkfield channel 26 separated by a shield wall 21. With the BD switch 18 in a bright field position as in FIG. 2, the light 24 is limited to a beam that is reflected off of the mirror 25 to enter the brightfield channel 22, which directs the illuminating light 24' through the BD objective 20 toward the surface S of the specimen 1 at an angle perpendicular (90 degrees) to the plane of the specimen 1 and allows the reflected light 30 to pass to the oculars or camera 12. As seen in FIG. 3, when the BD switch 18 is in a darkfield position the light 24 is limited to an annular beam that is reflected off of the mirror 25 to enter the darkfield channel 26, which is an annular channel directing illuminating light 24" toward the specimen at an angle less than 90 degrees and typically 25 to 75 degrees.

It can be seen in FIG. 2 that the light path in brightfield (illuminating light 24') is projected through the center of the nosepiece 28 and through the brightfield channel 22 of the BD objective 20. The reflected light 30 is reflected back through the brightfield channel 22, through the nosepiece 28 and tube lens 32 and is affected by any oculars and/or captured by a camera 12. It is seen here that the illumination light 24' in brightfield is at 90 degrees to the surface S of the specimen 1 and the reflected light 30 that is measured travels parallel to the illumination light 24' but in an opposite direction. The projected illuminating light 24' illuminates the entire field of view.

FIG. 3 shows the microscope 10 in darkfield mode. Here the light 24 is blocked by the darkfield switch 18 so that no light passes through the brightfield channel 22 and is instead directed to pass through the darkfield channel 26 as illuminating light 24". This produces an annular beam (or, in other terms, a hollow cylinder or annular cylinder) of light that is projected toward the specimen 1 at an oblique angle determined by the design of the objective 20 and wall of the darkfield channel 26. As known, the BD objective will have mirrors and/or prisms and/or light diffusers built into the objective to direct the oblique light. The illuminating light 24" reflects off the surface S of the specimen 1 and the reflected light 30 travels up the brightfield channel to the ocular or camera 12. The projected darkfield illuminating light 24" illuminates the entire field of view from about the entire periphery (360 degrees) of the objective.

In brightfield imaging it can be seen that the field of view F, which takes in at least a portion of the specimen 1, is filled by direct 90 degrees illumination (the incoming illuminating light 24' is orthogonal to the general resting plane of the specimen 1) whereas in darkfield imaging, the field of view F is filled by oblique illumination (the incoming illuminating light 24" is at an oblique angle to the general resting plane of the specimen 1). The darkfield illumination is evenly distributed through the 360 degree circumference of the BD objective 20.

SUMMARY OF THE INVENTION

In a first embodiment, the present invention provides a process for imaging a surface of a specimen with an imaging system that employs a BD objective having a darkfield channel and a bright field channel, the BD objective having a circumference, the process including the steps of: obliquely illuminating the specimen through the darkfield channel with a first arced illuminating light that obliquely illuminates the specimen through a first arc of the circumference, said first arced illuminating light reflecting off of the surface of the specimen; recording a first image of the specimen from the first arced illuminating light reflecting off the surface of the specimen; and generating a 3D topography of the specimen by processing the first image through a topographical imaging technique.

In a second embodiment, the present invention provides an imaging system as in any of the forgoing embodiments, wherein the first arc is from 1 degree or more to 180 degrees or less.

In a third embodiment the present invention provides an imaging system as in any of the forgoing embodiments, wherein the first arc is from 2 degrees or more to 5 degrees or less.

In a fourth embodiment, the present invention provides an imaging system as in any of the forgoing embodiments, further including the step of: obliquely illuminating the specimen through the darkfield channel with a second arced illuminating light that obliquely illuminates the specimen through a second arc of the circumference different from said first arc, said second arced illuminating light reflecting off of the surface of the specimen; and recording a second image of the specimen from the second arced illuminating light reflecting off the surface of the specimen, wherein said step of generating a 3D topography includes processing the second image through a topographical imaging technique.

In a fifth embodiment, the present invention provides an imaging system as in any of the forgoing embodiments, wherein all said obliquely illuminating steps include: providing a light barrier in the darkfield channel, the light barrier having a body that does not permit the passage of light therethrough, and a darkfield opening in the body that does permit the passage of light therethrough, and delivering illuminating light into the darkfield channel to the light barrier and through the darkfield opening to provide the arced illuminating light that obliquely illuminates the specimen.

In a sixth embodiment, the present invention provides an imaging system as in any of the forgoing embodiments, including a processor controls the oblique illumination of any said oblique illumination step and controlling any said image recording step.

In a seventh embodiment, the present invention provides an imaging system as in any of the forgoing embodiments, wherein the processor controls said step of generating a 3D topography.

In an eighth embodiment, the present invention provides an imaging system as in any of the forgoing embodiments, including the step of: orthogonally illuminating the specimen through the brightfield channel with brightfield illuminating light, said brightfield illuminating light reflecting off of the surface of the specimen; and recording a third image of the specimen from the brightfield illuminating light reflected off the surface of the specimen, wherein said step of generating a 3D topography includes processing the third image through a topographical imaging technique.

In a ninth embodiment, the present invention provides an imaging system as in any of the forgoing embodiments, wherein the topographical imaging technique is selected from shape from shading techniques, photometric stereo techniques, and Fourier ptychography modulation techniques.

In a tenth embodiment, the present invention provides an improvement to an imaging apparatus for imaging a surface of a specimen, the imaging apparatus employing a BD objective having a darkfield channel and a bright field channel, the BD objective having a circumference. The improvement includes placing a light barrier in the darkfield channel, the light barrier having a body that does not permit the passage of light therethrough, and a darkfield opening in the body that does permit the passage of light therethrough, such that the body blocks illuminating light traveling through the darkfield channel toward the specimen. The opening defines a passage for the illuminating light traveling through the darkfield channel toward the specimen, and thus defines arced illuminating light that obliquely illuminates the specimen through the darkfield channel from a discrete direction through only an arc of the circumference.

In an eleventh embodiment, the present invention provides an imaging apparatus as in any of the forgoing embodiments, wherein said arc is from 1 degree or more to 180 degrees or less.

In a twelfth embodiment, the present invention provides an imaging apparatus as in any of the forgoing embodiments, wherein said arc is from 2 degrees or more to 5 degrees or less.

In a thirteenth embodiment, the present invention provides an imaging apparatus as in any of the forgoing embodiments, further comprising a processor employing topographical imaging techniques on images taken by said imaging apparatus.

In a fourteenth embodiment, the present invention provides an imaging apparatus as in any of the forgoing embodiments, wherein the light barrier rotates so as to permit the placement of said opening at variable positions about said circumference.

DETAILED DESCRIPTION OF ILLUSTRATIVE EMBODIMENTS

The present invention modifies a standard BD microscope or other instrument using a BD objective so that in brightfield the BD objective transmits light normally and as described above. In darkfield, the light transmitted through the darkfield channel is limited so that the darkfield illumination is not through the entire 360 degree circumference of the BD objective but rather through only a portion of the circumference.

Figure 4:
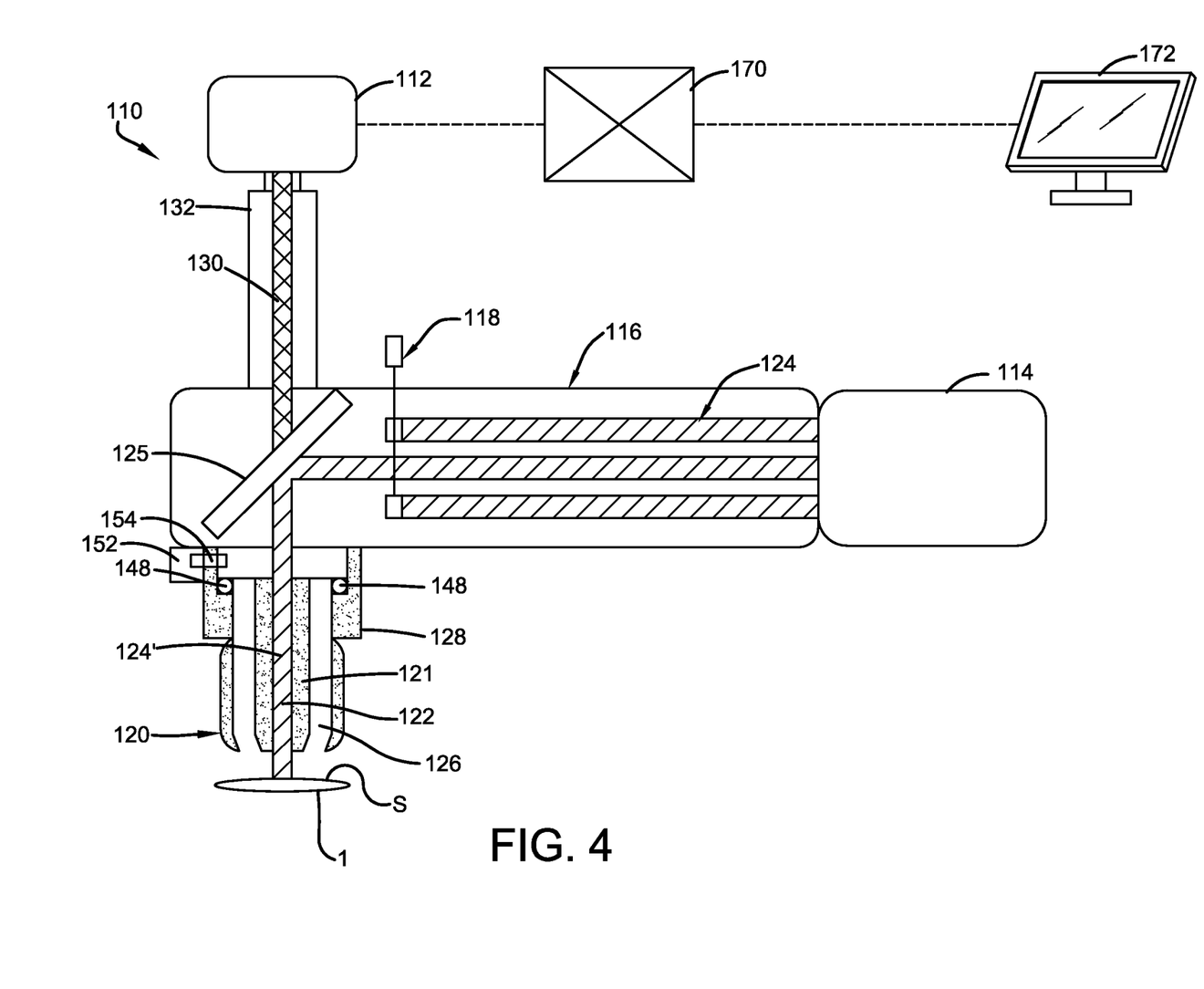
FIG. 4 is a schematic representation of a brightfield/darkfield microscope in accordance with this invention, shown in brightfield imaging mode.
Figure 5:
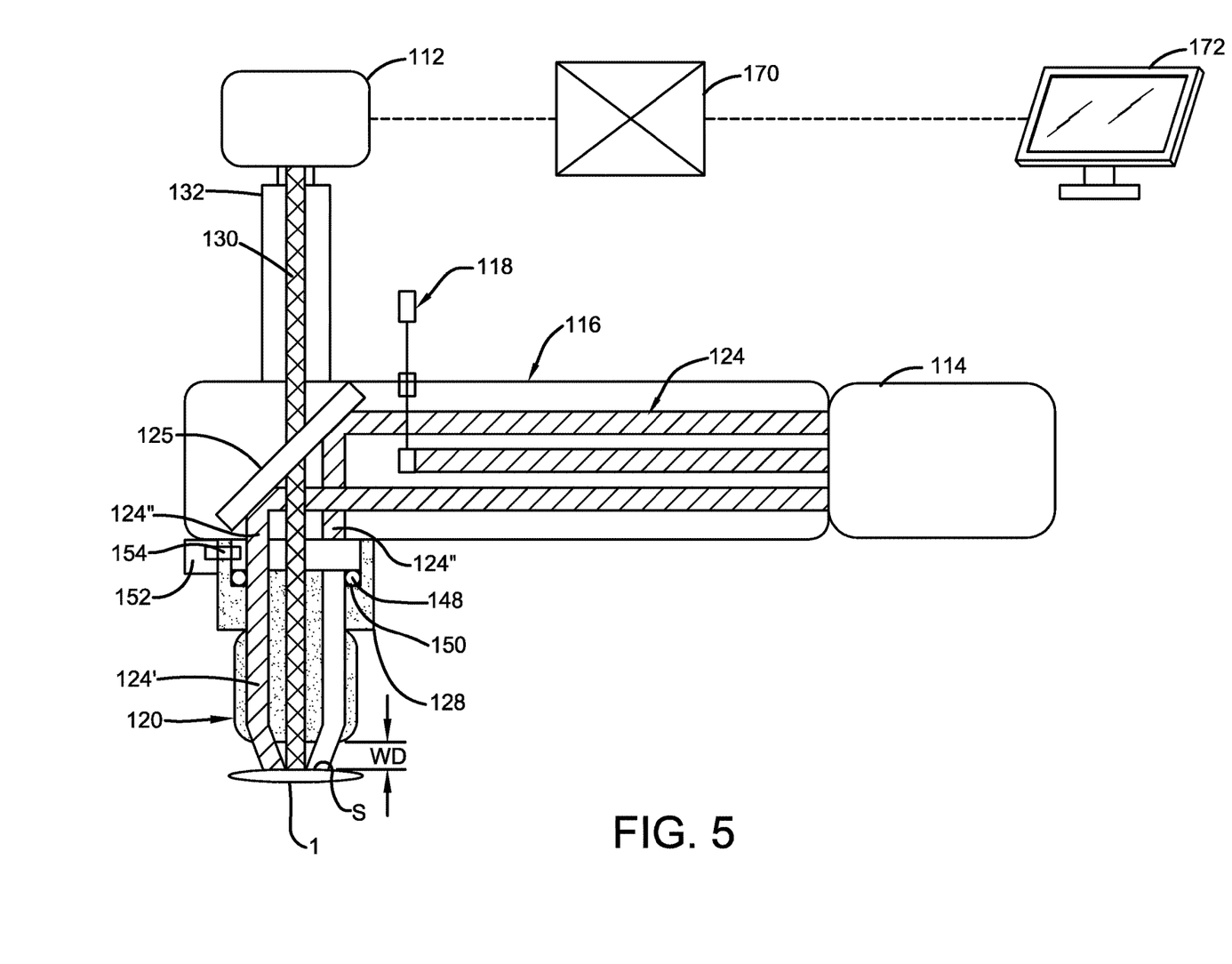
FIG. 5 is a schematic representation of a brightfield/darkfield microscope in accordance with this invention, shown in darkfield imaging mode.

With reference to FIGS. 4 and 5 a microscope employing brightfield and darkfield functionality in accordance with this invention is shown and designated by the numeral 110. In this embodiment the microscope 110 is equipped with a camera 112. Oculars may also be present, such that 112 is to broadly represent oculars and/or a camera. Although the following description will refer to a reflected light microscope, similar techniques apply to transmitted light microscopes or other instruments using BD objectives. The systems generally consist of a light source 114 providing light 124, a vertical illuminator 116 (light guide), a brightfield/darkfield (BD) switch 118 and a BD objective 120. As in a standard BD objective 20, two channels are provided to guide the light to the specimen 1. The light 124 is directed to a mirror 125 that reflects the light 124 toward the specimen 1 downwardly through the vertical illuminator 116, the nosepiece 128, and BD objective 120.

The BD switch 118, as schematically shown, serves to limit the light 124 to pass either into a brightfield channel 122 (FIG. 4) or darkfield channel 126 (FIG. 5) separated by a shield wall 121. With the BD switch 118 in a bright field position as in FIG. 4, the light 124 is limited to a beam that is reflected off of the mirror 125 as illuminating light 124' to enter the brightfield channel 122, which directs the illuminating light 124' through the BD objective 120 toward the surface S of the specimen 1 at an angle perpendicular (90 degrees) to the plane of the specimen 1 and allows the reflected light 130 to pass to the oculars or camera 112. As seen in FIG. 5A, when the BD switch 118 is in a darkfield position the light 124 is limited to an annular beam that is reflected off of the mirror 125 to enter the darkfield channel 126, which is an annular channel directing light coming therethrough toward the specimen at an angle less than 90 degrees and typically 25 to 75 degrees.

In some embodiments, the darkfield channel 126 directs illuminating light toward the specimen at an angle less than 90 degrees, in other embodiments, less than 80 degrees, in other embodiments, less than 70 degrees, in other embodiments, less than 80 degrees, in other embodiments, less than 70 degrees, in other embodiments, less than 60 degrees, in other embodiments, less than 50 degrees, in other embodiments, less than 40 degrees, and, in other embodiments, less than 30 degrees. In some embodiments, the darkfield channel 126 directs illuminating light toward the specimen at an angle greater than 20 degrees, in other embodiments, greater than 30 degrees, in other embodiments, greater than 40 degrees, and in other embodiments, greater than 50 degrees.

The distance between the distal end of the objective and the specimen is known as the working distance (see FIG. 5A). In some embodiments, the working distance is from 0.05 mm or more to 40 mm or less. In some embodiments, the working distance is from 0.7 mm or more to 30 mm or less, and, in other embodiments, from 1 mm or more to 25 mm or less mm. In some embodiments, the working distance is 10 mm or less, in other embodiments, 5 mm or less, in other embodiments, 3 mm or less, in other embodiment, 2mm or less, in other embodiments, 1.5 mm or less and, in other embodiments, 1 mm or less.

In some embodiments, the field of view of the BD objective 20 is less than 10 mm. In some embodiments, the field of view of the BD objective is less than 5 mm, in other embodiments, less than 2 mm, in other embodiments, less than 1 mm, in other embodiments, less than 500 µm, in other embodiments, less than 200 µm, in other embodiments, less than 100 µm, in other embodiments, less than 50 µm.

When viewing a microscopic specimen at, for example, a size of less than 10 µm, the distance of the microscope objective is often less than 5 mm from the surface of the specimen depending on the working distance of the objective. For example a typical working distance, WD, of a 50× objective is less than 2 mm and, for a 100× objective, is typically 1 mm or less. The physical outside diameter of an objective is typically between 20 and 50 mm. By way of example, with a 20 mm diameter specimen and 5 mm WD, the angle of the light projecting off the surface would be approximately 26 degrees. In the more likely case of a WD of 1 mm the angle of light projecting on the specimen would be 6 degrees. Photometric stereo optimally uses illumination at 30 to 80 degrees. In most microscope use cases, then, it would not be possible to determine topographies of specimens using photometric stereo or other imaging techniques requiring oblique lighting due to the low incident of oblique illumination.

The present invention uses the darkfield channel of the objective to direct the light onto the surface of the specimen. This allows the light source to be much closer to the vertical axis of illumination. In the above standard illumination the light had to be outside the radius of the objective. The use of the darkfield channel allows the light source to be within the radius of the specimen and essentially be adjacent to the light path. The distance from the vertical axis can now be approximately equal to the WD allowing an angle of illumination to be 45 degrees. This angle may vary slightly with the design of the objective but is typically in the range of 25 to 75 degrees. Thus, the imaging systems according to this invention achieve oblique illumination angles despite the very tight working distances required in many applications. The method taught herein can be used to determine topographies in microscopy applications that could not be achieved by standard methods.

It can be seen in FIG. 4 that the light path in brightfield (illuminating light 124') is projected through the center of the nosepiece 128 and through the brightfield channel 122 of the BD objective 120. The reflected light 130 is reflected back through the brightfield channel 122, through the nosepiece 128 and tube lens 132 and is affected by any oculars and/or captured by a camera 112. It is seen here that the illumination light 124' in brightfield is at 90 degrees to the general resting plane of the specimen 1 and the reflected light 130 that is measured travels parallel to the illumination light 124' but in an opposite direction. FIG. 4B shows a schematic cross sectional view of the specimen 1 and the brightfield illumination light 124' that is projected onto the specimen 1. The projected brightfield illumination light 124' illuminates the entire field of view.

FIG. 5 shows the microscope 110 in darkfield mode. Here the light 124 is blocked by the darkfield switch 118 so that no light passes through the brightfield channel 122 and is instead directed to pass through the darkfield channel 126 as illuminating light 124''. As with the embodiment of FIG. 3 of the prior art, this blocking of the light 124 produces an annular beam (or, in other terms, a hollow cylinder or annular cylinder) of light reflected off of mirror 125 and projected toward the specimen 1. However, in distinction over the prior art, the entirety of that annular beam of illuminating light 124'' does not reach the specimen at an oblique angle determined by the design of the objective 120 and wall of the darkfield channel 126. Instead, only a portion of the light at from less than the entire 360 degree circumference of the BD objective is delivered down the darkfield channel to reach the specimen, as arced illuminating light 124\*. This arced illuminating light 124\* still illuminates the entire field of view, but, rather than doing so from the entire 360 degree circumference of the objective, does so from a discrete direction of limited degrees (or minutes of arc), i.e., from only a portion of the circumference. In other embodiments, the darkfield projection of arced illuminating light 124\* illuminates the entire field of view from a discrete direction of limited degrees (or minutes of arc), and the darkfield illumination is devoid of any additional illumination that would interfere with the surface shading caused by the obliquely introduced arced illuminating light 124\*. This is accomplished by positioning a light barrier 140 in the path of the illuminating light 124".

Figure 6:
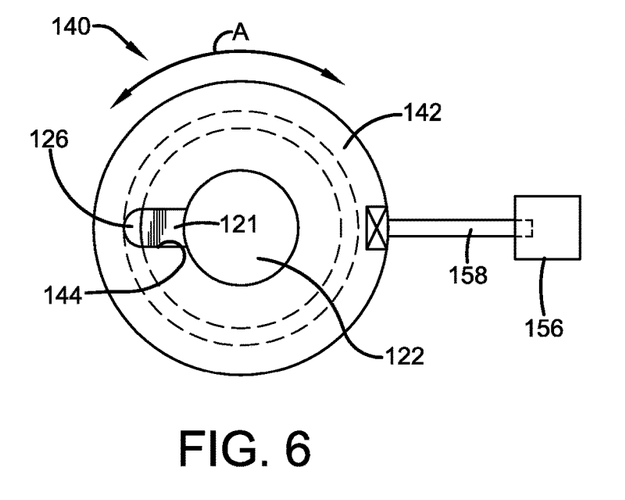
FIG. 6 is a top plan view of an embodiment of a light barrier of this invention.

In some embodiments, such as that shown in FIG. 6, the light barrier 140 has a body 142 with a darkfield opening 144 therein so that unwanted illuminating light 124" is blocked and a desired arced illuminating light 124\* passes through the opening to be projected toward the specimen 1 through less that the entire 360 degree circumference practiced in the prior art. The body 142 of the light barrier 140 does not let illuminating light 124" pass through, while the darkfield opening 144 simply defines an open path for the illuminating light 124", which is then defined as arced illuminating light 124\* after being limited by passage through the light barrier opening 144. The light barrier 140 also defines a brightfield opening 146 for the brightfield channel 122 and illuminating light 124', as well as all reflected light whether from brightfield or darkfield illumination.

FIG. 5 shows a schematic cross sectional view of the specimen 1 and the arced of illumination light 124\* that is projected onto the specimen 1. The projected arced illuminating light 124\* illuminates the entire field of view, but at an oblique angle and from a discrete position. With reference back to FIG. 5, it is seen that only the left side of the darkfield channel 126 is shown having arced illuminating light 124\* traveling therethrough, as that reflects the location of the darkfield opening 144 in the light barrier 140. The illumination thus comes from that direction and shines at an oblique angle across the field of view.

In some embodiments, the light barrier 140 is secured in the nosepiece 128. In other embodiments, the light barrier 140 is secured in the vertical illuminator 116. It will be appreciated that the light barrier 140 and concepts related herein can be implemented in other ways as well, such as in the BD objective 120.

In some embodiments, such as that in FIG. 5A, the light barrier 140 is mounted in the nosepiece 128, and is secured to a bearing housing 148 that is secured to the nosepiece 128 without intruding upon the darkfield channel 126 and the light traveling therethrough, i.e., it is desirable that the light be unaffected by the encroachment of the bearing housing 148 in the darkfield channel 126. The bearing housing 148 includes bearings 150 permitting the rotation of the light barrier 140 to position the darkfield opening 144 at a desired position about the circumference of the BD objective 120, thus defining the arced illuminating light 124\* projected toward the specimen 1. The rotation is visually represented in FIG. 6 by the double-headed arrow A.

In some embodiments, a driver 152 serves to rotate the light barrier 140 to place the darkfield opening 144 in a desired position. In some embodiments, the driver 152 is a motor that interacts with the light barrier 140 through a belt 154, but gearing and other interactions can be employed. It will be appreciated that the driver 152 could also be a manually manipulated driver, such as a wheel or knob geared or belted or otherwise associated with the light barrier 140 to rotate it.

In some embodiments, a sensor 156 is mounted to the microscope 110 at an appropriate location to identify a zero position for the light barrier 140. The sensor 156 on the microscope 110 will identify the zero position when the sensor aligns with a reference element 158 on the light barrier 140. The zero position establishes a known starting position for the light barrier 140 and more particularly the darkfield opening 144 therein, and this known starting position is used for indexing imaging so that each image recorded by the camera 112 has associated with it a known lighting position relative to the specimen.

The camera can be any camera useful in imaging systems and specifically used for imaging specimens intended for topographical analysis. These will often employ a CCD or CMOS sensors.

It will be appreciated that the control of all elements of the microscope can be implemented in known ways, typically with some or all controls being implemented through various hardware and/or software and/or firmware, all represented and designated herein as a processor 170. One or more processors can be used and a myriad of hardware such as joysticks, relays, switches among others. The processor 170 can record the images taken from the camera and be programmed with the appropriate algorithms to analyze one or more images and recreate a topographical image of the portion of the specimen imaged.

For the topographical imaging techniques implemented by the processor 170, it is typically necessary or at least helpful to have associated with a particular image the positioning of the incoming oblique light relative to the circumference of the objective. The shading created by the oblique light is dependent upon the position of the incoming light relative to the circumference, and establishing a zero position facilitates the automation of processes for taking multiple images and calculating topographies based upon those multiple images. Once a zero position is established, the processor and associate hardware and/or firmware and/or software can carry out an automated process of providing oblique illumination from a first position about the circumference, taking an image and collecting image data and associating it with the illumination from the first position, then providing oblique illumination from a second position about the circumference, taking an image and collecting image data and associating it with the illumination from the second position positional data; repeating the process as desired to obtain a desired number of imaging data sets from a desired number of illuminating positions. In some embodiments, the sensor 156 is an optical proximity sensor, wherein a light shined by the sensor 156 is blocked by a reference element 158 on the light barrier 140 when the sensor 156 and reference element 158 are aligned. In other embodiments, the sensor 156 magnetic position sensor, working by sensing a magnet serving as a reference element. Mechanical limit switches and Hall effect sensors are other examples.

Figure 7:
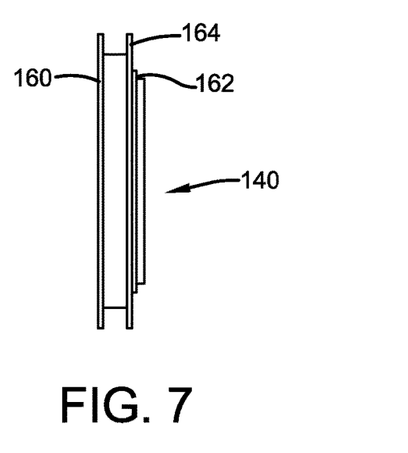
FIG. 7 is a side view of an embodiment of a light barrier of this invention.

In some embodiments, such as seen in FIG. 7 the light barrier 140 has a spool-like shape with two opposed walls 160, 162, with a separating sidewall 164. A belt such as belt 154 (or gearing or other drive mechanisms) can engage the sidewall 164 to drive the light barrier 140.

Figure 8A:
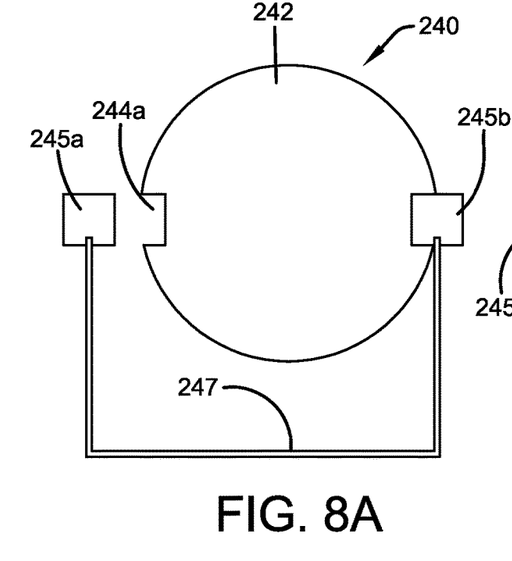
FIG. 8A is a schematic representation of another embodiment of a light barrier of this invention, showing a plug unit providing multiple plugs to selectively cover and uncover two openings therein, with the plug moved to uncover the opening on the left and cover the opening on the right.
Figure 8B:
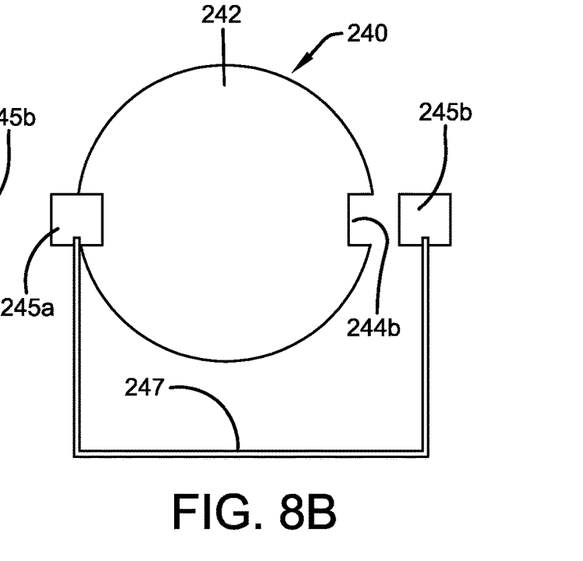
FIG. 8B is a schematic representation of the embodiment of a light barrier of FIG. 8A, but with the plug moved to uncover the opening on the right and cover the opening on the left.

In some embodiments, such as that shown in FIGS. 8A and 8B, a light barrier 240 has multiple openings represented at darkfield openings 244a and 244b, but any number of openings can be employed taking into account obvious size constraints. The darkfield openings 244a, 244b join to the perimeter of the of the body 242 of the light barrier so that moveable plugs 245a and 245b can be employed to selectively block a respective darkfield opening 244a, 244b. In the embodiment of FIG. 8A the darkfield openings 244a and 244b are opposite one another, and the moveable plugs 245a and 245b are joined, forming a plug unit 247 such that when the movable plug 245b blocks darkfield opening 244b, the movable plug 245a is removed from darkfield opening 244a (as in FIG. 8A) and vice versa (as in FIG. 8B). This allows light to pass through a desired darkfield opening 244a, 244b, providing the arced illuminating light 124*, and also allows for quick switching of the positioning of the arced illuminating light 124*, by switching the positioning of the plug unit 247. It can be appreciated that multiple slits and moveable plugs may be employed, and that each plug could have its own control as opposed to the common control established in the present exemplary embodiment of FIGS. 8A and 8B.

Figure 9A:
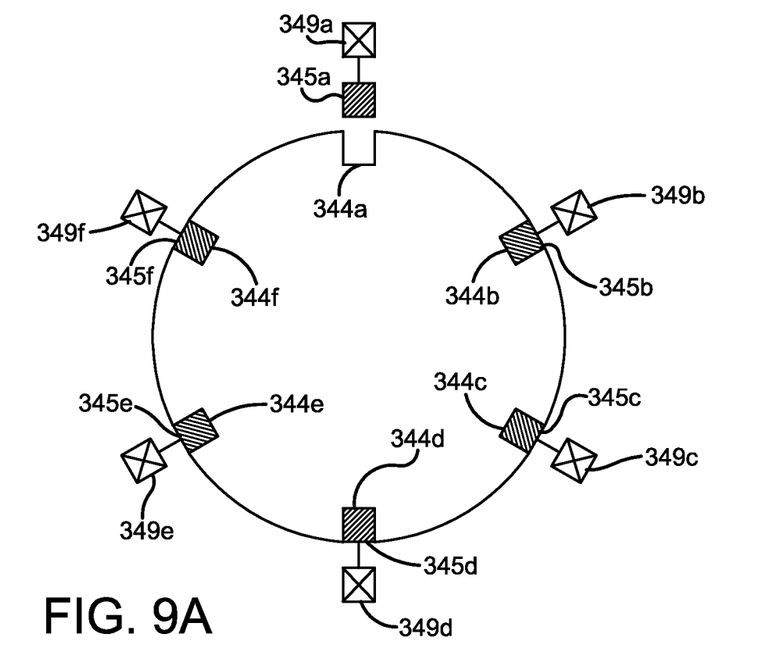
FIG. 9A is a schematic representation of another embodiment of a light barrier of this invention, showing a body having multiple openings therein, each with its own separately actuated plug, actuated to either open or close its associated opening.
Figure 9B:
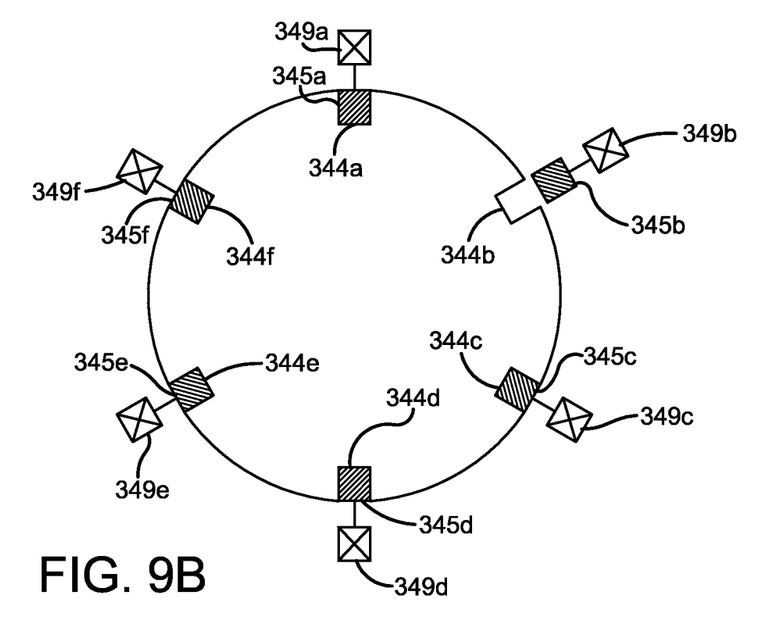
FIG. 9B is a schematic representation of the light barrier embodiment of FIG. 9A, but shown with a different opening opened by movement of an associated plug.

In another embodiment, such as that shown in FIGS. 9A and 9B, a light barrier 340 has six darkfield openings 344a, 344b, 344c, 344d, 344e, and 344f spaced at 60 degrees apart around the circumference of the body 242 of the light barrier. Any number and position desired could alternatively be employed. The darkfield openings 344a-f join to the perimeter of the of the body 342 of the light barrier 340 so that moveable plugs 345a, 345b, 345c, 345d, 345e, and 345f can be employed to selectively block a respective darkfield opening 344a-f. In this embodiment, the movable plugs 345a-f each can be actuated independently to block a respective opening. To visually represent the selective movement, plug 345a is shown removed from its opening 344a in FIG. 9A, with all other plugs seated to block their respective openings, while, in FIG. 9B, plug 345b is shown removed from its opening 344b, with all other plugs seated to block their respective openings.

In some embodiments, such plugs can be moved by linear actuators, solenoid, eccentric, or any other known method of motion control. Linear actuators 349a, 349b, 349c, 349d, 349f are employed.

In any embodiment, the size of the arced illuminating light 124* may vary as desired based on results achieved and results desired. This entails a choice of the sizing of the darkfield opening 144 (or 244a, 244b) In some embodiments, the arced illuminating light 124* ranges from 1 degree or more to 180 degrees or less (60 or more to 10,800 or less minutes of arc). In other embodiments, the arced illuminating light 124* ranges from 45 degrees or more to 120 degrees or less (2,700 or more to 7,200 or less minutes of arc), in other embodiments, from 30 degrees or more to 45 degrees or less (1,800 or more to 2,700 or less minutes of arc), in other embodiments, from 10 degrees or more to 30 degrees or less (600 or more to 1,800 or less minutes of arc), in other embodiments, from 5 degrees or more to 10 degrees or less (300 or more to 600 or less minutes of arc), and, in other embodiments, from 2 degrees or more to 5 degrees or less (120 or more to 300 or less minutes of arc). The size of the arced illuminating light is dependent upon the size of the darkfield opening 144 relative to the arc of the annular darkfield channel 126 with which it communicates.

Another aspect of the invention is to use the oblique lighting BD microscopes described above to create a 3D topography by taking multiple images of a specimen 1 obliquely illuminated with arced illuminating light 124* from different positions about the 360 circumference of the BD objective 120 using the light barrier 140, and processing the data from those images in accordance with topographical imaging techniques. The choice of topographical imaging technique is not limited to any particular technique, but, in some embodiments, is selected from shape from shading techniques, photometric stereo techniques, and Fourier ptychography modulation techniques. The processor 170 receives the imaging data from the camera 112 and is programmed through one or more topographical imaging techniques to generate data used to create a topographical representation of the area of the specimen 1 that was imaged. This is represented at output 172. Using known techniques such as shape from shading algorithms, photometric stereo algorithms, and Fourier ptychography modulation algorithms with the know size, number, and position of the arced illuminating light, the angle of the oblique illumination, a 3D topography can be generated.

In some topographical imaging techniques such as shape from shading (SFS), a single obliquely illuminated specimen image generated from arced illuminating light at a single position can be sufficient to generate topographical data and images. In other topographical imaging techniques such as photometric stereo, at least two obliquely illuminated specimen images generated from arced illuminating light at two positions can be sufficient to generate topographical data and images. In other topographical imaging techniques such as Fourier ptychography modulation, at least two obliquely illuminated specimen images generated from arced illuminating light at two positions plus an image from brightfield illumination is needed to generate topographical data, and 10 or more obliquely illuminated specimen images will provide even better data for Fourier ptychography modulation. The existing algorithms and algorithms yet to be developed in this field will provide the ordinarily skilled artisan with the knowledge as to the number of type of images needed. The present invention does not invent or alter the algorithms but rather provides methods and apparatus that allows for their implementation.

It will be appreciated that, in some embodiments, the processor 170 (which again, represents any number of appropriate processors, hardware, software, firmware), automates the control of the light barrier, the illumination, the image collection and generation of topographical data and/or images.

Thus this invention provides a process for imaging a specimen with an imaging system that employs a BD objective having a darkfield channel and a bright field channel and defining a circumference about the specimen to be imaged. The process includes obliquely illuminating the specimen through the darkfield channel with a first arced illuminating light that obliquely illuminates the specimen through a first arc of the circumference, and taking a first image providing a first image data set of the specimen from the first arced illuminating light reflected off the surface of the specimen. In some embodiments, the process further includes generating a 3D topography of the specimen by processing the first data through a topographical imaging technique. In some embodiments, the arc sizes are selected as described above for the arced illuminating light 124*.

In other embodiments, the process includes, obliquely illuminating the specimen through the darkfield channel with a second arced illuminating light that obliquely illuminates the specimen through a second arc of the circumference of the BD objective different from said first arc, and taking a second image providing a second image data set of the specimen from the second arced of illuminating light reflected off the surface of the specimen. In other embodiments, the process further includes illuminating the specimen through the brightfield channel with brightfield illuminating light, and taking a third image of the specimen from the brightfield illuminating light reflected off the surface of the specimen. In other embodiments, the process further includes repeating said obliquely illuminating step and said taking an image step for any n number of images producing n number of image data sets. In other embodiments, n is from 2 to 12, in other embodiments, from 3 to 9, in other embodiments, from 4 to 7, and in other embodiments, 6.

In other embodiments, said obliquely illuminating steps include providing a light barrier in the darkfield channel, the light barrier having a body that does not permit the passage of light therethrough, and a darkfield opening in the body that does permit the passage of light therethrough, and delivering illuminating light into the darkfield channel to the light barrier and through the darkfield opening to provide the arced illuminating light that obliquely illuminates the specimen.

In other embodiments, the process includes a processor and associate hardware and/or firmware and/or software controlling the oblique illumination of any said oblique illumination step and controlling any said image taking step. In other embodiment a same or different processor and associate hardware and/or firmware and/or software controls said step of generating a 3D topography.

In some embodiments, the light barrier 140 may remain stationary to allow an image to be captured from a single position. In some embodiments, the light barrier 140 may be rotated to allow multiple images to be captured at known, specific positions of the darkfield opening 144. In some embodiments, the light barrier (such as light barrier 240) will have multiple openings and plugs, with the plugs sequentially manipulated to open a pathway for the arced illuminating light 124*. In some embodiments, the positions are generally symmetrical such as two images captured 180 degrees apart; three images captured at 120 degrees apart, six images captured at 60 degrees apart, and so on. It will be appreciated that these measurements would have the midpoint of each arc of each arced illumination as a reference point, with the measurement made from mid-point to mid-point. It should be appreciated that the invention allows one or more images to be captured using the darkfield oblique light and still allows a brightfield image to be captured at 90 degrees.

In light of the foregoing, it should be appreciated that the present invention significantly advances the art by providing an imaging system and topographical imaging method that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A process for imaging a surface of a specimen with an imaging system that employs a microscope selected from a reflected light microscope and a transmitted light microscope including a BD objective having a darkfield channel and a brightfield channel, the BD objective having a circumference, the process including steps of:
obliquely illuminating the specimen through the darkfield channel with a first arced illuminating light that obliquely illuminates the specimen through a first arc of the circumference, said first arced illuminating light reflecting off of the surface of the specimen, wherein the obliquely illuminating step includes:
providing a light barrier in the darkfield channel, the light barrier having a body that does not permit passage of light therethrough, and
delivering illuminating light into the darkfield channel to the light barrier and through a darkfield opening to provide the arced illuminating light that obliquely illuminates the specimen; and
recording a first image of the specimen from the first arced illuminating light reflecting off the surface of the specimen, wherein the first arced illuminating light reflecting off the surface of the specimen is reflected back through the brightfield channel and recorded as the first image; and
generating a 3D topography of the specimen by processing the first image through a topographical imaging technique, wherein topographical data is generated from the first image recorded in the step of recording the first image.

2. The process of claim 1, wherein the first arc is from 1 degree or more to 180 degrees or less.

3. The process of claim 2, wherein the first arc is from 2 degrees or more to 5 degrees or less.

4. The process of claim 1, further including the step of:
obliquely illuminating the specimen through the darkfield channel with a second arced illuminating light that obliquely illuminates the specimen through a second arc of the circumference different from said first arc, said second arced illuminating light reflecting off of the surface of the specimen; and
recording a second image of the specimen from the second arced illuminating light reflecting off the surface of the specimen, wherein the first arced illuminating light reflecting off the surface of the specimen is reflected back through the brightfield channel and recorded as the second image, and wherein said step of generating a second 3D topography includes processing the second image through the topographical imaging technique.

5. The process of claim 4, including a processor that controls the oblique illumination of any said oblique illumination step and controls any said image recording step.

6. The process of claim 5, wherein the processor controls said step of generating the 3D topography.

7. The process of claim 6, further including the step of:
orthogonally illuminating the specimen through the brightfield channel with brightfield illuminating light, said brightfield illuminating light reflecting off of the surface of the specimen; and
recording a third image of the specimen from the brightfield illuminating light reflected off the surface of the specimen, wherein the brightfield illuminating light reflecting off the surface of the specimen is reflected back through the brightfield channel and recorded as the third image, and wherein said step of generating a third 3D topography includes processing the third image through the topographical imaging technique.

8. The process of claim 1, wherein the topographical imaging technique is selected from shape from shading techniques, photometric stereo techniques, and Fourier ptychography modulation techniques.

9. An imaging apparatus for imaging a surface of a specimen, the imaging apparatus comprising:
a microscope selected from reflected light microscopes and transmitted light microscopes, the microscope including:

a BD objective having a darkfield channel and a brightfield channel, the BD objective having a circumference;

a light barrier in the darkfield channel, the light barrier having a body that does not permit the passage of light therethrough, and a darkfield opening in the body that does permit passage of light therethrough, such that the body blocks illuminating light traveling through the darkfield channel toward the specimen, and the darkfield opening defines a passage for the illuminating light traveling through the darkfield channel toward the specimen, said darkfield opening thus defining arced illuminating light that obliquely illuminates the specimen through the darkfield channel from a discrete direction through only an arc of the circumference;

means for recording a first image of the specimen from a first arced illuminating light reflecting off the surface of the specimen, wherein the first arced illuminating light reflecting off the surface of the specimen is reflected back through the brightfield channel and is captured by the means for recording the first image; and a processor generating a 3D topography of the specimen by processing the first image through a topographical imaging technique, wherein topographical data are generated from the first image captured by the means for recording.

10. The imaging apparatus of claim 9, wherein said arc is from 1 degree or more to 180 degrees or less.

11. The imaging apparatus of claim 10, wherein said arc is from 2 degrees or more to 5 degrees or less.

12. The imaging apparatus of claim 9, wherein the processor rotates the light barrier so as to permit placement of said darkfield opening at variable positions about said circumference.

* * * * *